United States Patent
Stommel

(10) Patent No.: US 8,123,476 B2
(45) Date of Patent: Feb. 28, 2012

(54) METHOD FOR REGULATING A WIND ENERGY INSTALLATION

(75) Inventor: Matthias Stommel, Ganderkesee (DE)

(73) Assignee: Daubner & Stommel GBR Bau-Werk-Planung, Ganderkesee (DE)

(*) Notice: Subject to any disclaimer, the term of this patent is extended or adjusted under 35 U.S.C. 154(b) by 1007 days.

(21) Appl. No.: 12/088,296

(22) PCT Filed: Feb. 13, 2006

(86) PCT No.: PCT/EP2006/001278
§ 371 (c)(1),
(2), (4) Date: Mar. 27, 2008

(87) PCT Pub. No.: WO2007/038992
PCT Pub. Date: Apr. 12, 2007

(65) Prior Publication Data
US 2008/0260531 A1    Oct. 23, 2008

(30) Foreign Application Priority Data
Sep. 29, 2005 (DE) .......................... 10 2005 046 860

(51) Int. Cl.
*F03D 7/04* (2006.01)
(52) U.S. Cl. .................. 416/1; 416/36; 416/61; 290/44; 290/55
(58) Field of Classification Search ................. 416/1, 36, 416/61; 290/44, 55
See application file for complete search history.

(56) References Cited

U.S. PATENT DOCUMENTS

| | | | |
|---|---|---|---|
| 4,651,017 A | 3/1987 | Longrigg et al. | |
| 5,774,088 A * | 6/1998 | Kreithen | 342/22 |
| 6,623,243 B1 * | 9/2003 | Hodos | 416/61 |
| 7,315,799 B1 * | 1/2008 | Podolsky | 703/2 |
| 2004/0258521 A1 | 12/2004 | Wobben | |

FOREIGN PATENT DOCUMENTS

| | | |
|---|---|---|
| DE | 9 38 279 B | 1/1956 |
| DE | 36 25 773 C1 | 9/1987 |
| DE | 100 22 129 C2 | 11/2001 |
| DE | 102 31 299 A1 | 1/2004 |
| EP | 1 429 025 A | 6/2004 |
| GB | 2 280 035 A | 1/1995 |
| JP | 2003021046 | 1/2003 |

OTHER PUBLICATIONS

International Search Report.
German Search Report.

* cited by examiner

*Primary Examiner* — Igor Kershteyn
(74) *Attorney, Agent, or Firm* — Laurence P. Colton; Smith Risley Tempel Santos LLC

(57) ABSTRACT

A method of operating installations (10), in particular wind energy installations (10), having a component (22) which endangers flying animals, in which the component assumes a first state which endangers animals to a greater extent and a second state which endangers animals to a lesser extent. The physical environment around the installation (10), in particular the environment around the component (22), is monitored at least in regions by a suitable detection device. The detection device produces a signal when an animal of a specific type, in particular a bat, a bird or the like, enters the monitored region, and in which case the component of the installation is moved from the state which endangers animals to a greater extent to the state which endangers animals to a lesser extent depending on the signal.

22 Claims, 1 Drawing Sheet

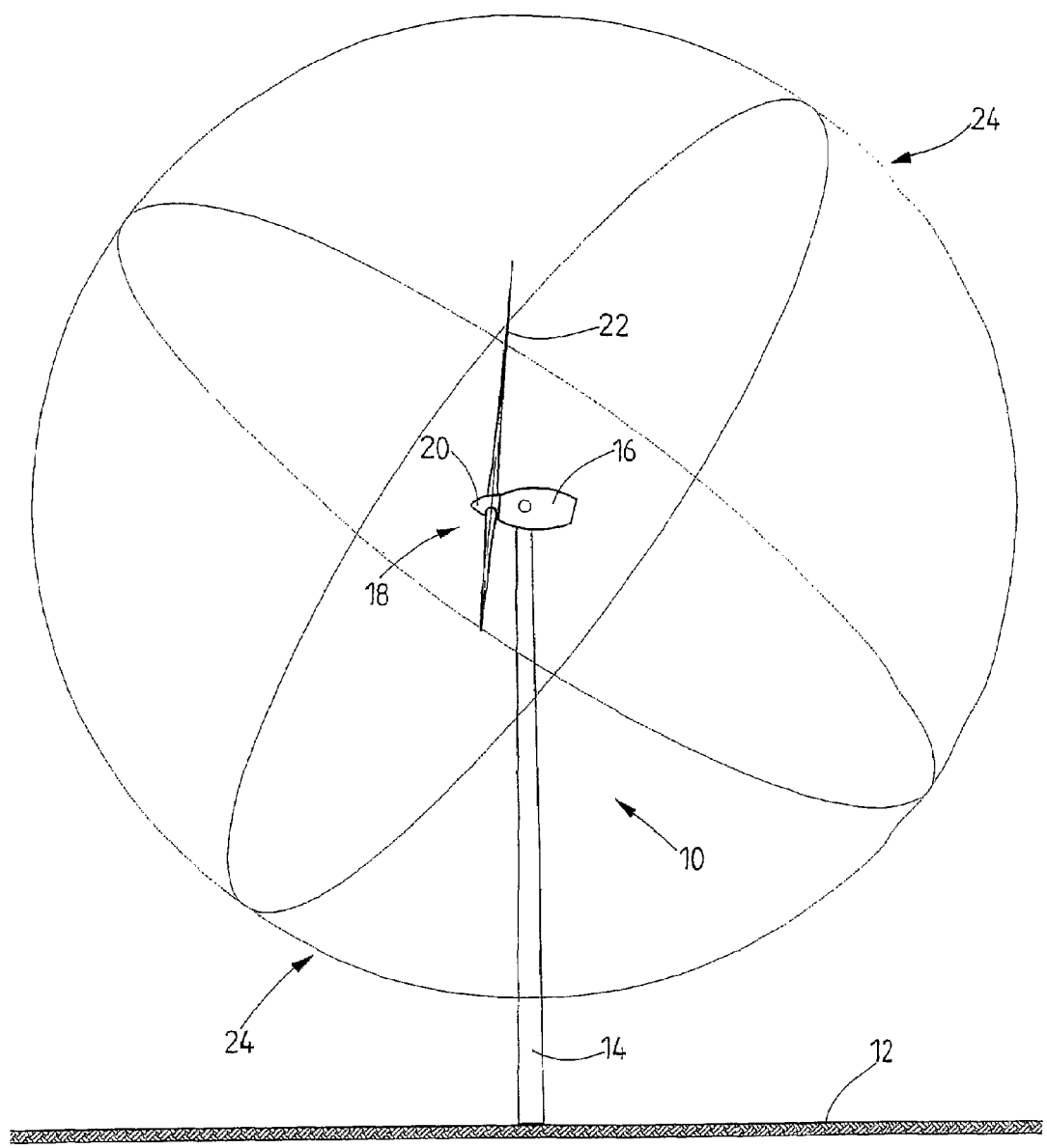

METHOD FOR REGULATING A WIND ENERGY INSTALLATION

STATEMENT OF RELATED APPLICATIONS

This application is the U.S. National Phase Under Chapter II of the Patent Cooperation Treaty (PCT) of PCT International Application No. PCT/EP2006/001278 having an International Filing Date of 13 Feb. 2006, which claims priority on German Patent Application No. 10 2005 046 860.8 having a filing date of 29 Sep. 2005.

BACKGROUND OF THE INVENTION

1. Technical Field

The present invention relates to a method for operating installations having at least one component which endangers in particular flying animals, it being possible for the component to assume a first state which endangers animals to a greater extent and a second state which endangers animals to a lesser extent. The present invention also relates to a method for keeping and/or driving in particular flying animals away from obstacles of any type, such as buildings, components, installations, fences or the like, which endanger these animals.

2. Related Art

It is known, in particular in the case of wind energy installations having horizontal-axis rotors, for flying animals, in particular bats, to often enter the region of the rotating rotor blades, for them to collide with the rotor blades and thus be killed. In order to prevent this, there are in part already official conditions for the operation of wind energy installations in areas in which a large number of bat flights can be expected. For example, the wind energy installations need to be completely shut down in individual areas at times at which bat flights are mainly expected, in particular at night, so that hazardous rotation of the rotor blades of the wind energy installation are avoided.

Shutdown of the wind energy installation over long periods of time, such as at nighttime, naturally results in considerable cost-intensive downtimes, in which the installations cannot produce any energy. The effects on operational efficiency are evident.

In the meantime, official licenses are in individual cases even completely refused for setting up wind energy installations in specific areas in which a particularly large number of bat flights are expected, although these areas would otherwise be suitable for wind energy installations.

However, it is not only wind energy installations which form obstacles for animals on which the animals can suffer fatal injuries in the event of a collision. It is known that, for example, migratory birds prefer specific fixedly predetermined flight routes. Unwittingly erected masts, bridges, houses or the like have been built within some of these flight routes. In particular at night, sometimes thousands of birds collide with such buildings and come to their end.

On the basis of this problem, it is one object of the present invention to specify a method of the type mentioned initially with which in particular flying animals can be safely protected against collision with installations, buildings, components, fences or the like which endanger them.

BRIEF SUMMARY OF THE INVENTION

This object is achieved by a method having the following features.

Accordingly, a method is specified for operating an installation having at least one component which endangers in particular flying animals, it being possible for the component to assume a first state which endangers animals to a greater extent and a second state which endangers animals to a lesser extent, the physical environment around the installation, in particular the environment around the component, being monitored at least in regions by means of a suitable detection device, in which case the detection device produces a signal when an animal of a specific type, in particular a bat, a bird or the like, enters the monitored region, and in which case the component of the installation is moved from the state which endangers animals to a greater extent to the state which endangers animals to a lesser extent depending on the signal. Later, the installation is moved back to the more dangerous state, that is a) depending on the number of animals of a specific type detected, in particular per unit time, and/or b) depending on the signal characteristic of the respectively produced signal, and/or c) if no animals of the specific type, which were triggers for the component being moved to the less dangerous state, are detected in the monitored region during a predetermined period of time.

It is possible to use the method according to the invention to operate all installations which have one or more components which can be moved from one state having a lower endangering potential for animals to a state having a greater endangering potential. These may be, for example, installations which have one or more components which move during operation, since the movement of the components entails a particularly high risk of collision for animals, in particular at nighttime. According to the invention, in one embodiment the moving component, for example, can be brought to a complete standstill within the monitored region in order to reduce the risk for the animals. Installations having components such as tubes may also be hazardous to animals if media having a particularly high or particularly low temperature are passed into the tubes such that the animals can suffer burns or be frozen on contact with the tubes. When one or more animals are detected within the monitored region, the flow of media can then be interrupted, for example, for a predetermined period of time. Installations may also have components through which current flows or components which are subject to an electrical voltage, by means of which the animals could be subjected to current. Once the animals have been detected in the monitored region, the current could be interrupted. As is known to those skilled in the prior art, a large variety of installations can be operated using the method according to the invention.

Monitoring should relate to animals of a specific type, i.e. the mentioned measures should, of course, not be introduced for all animals which enter the monitoring region. If, for example, particularly small animals such as insects or the like enter the monitored region, the installation should continue to run with the customary operation, without any intervention in the operation.

According to the invention, the endangering component of the installation is moved from the state which endangers animals to a greater extent to the state which endangers animals to a lesser extent depending on the signal from the detection device. This can be carried out depending on the number of animals detected, in particular per unit time, and/or depending on the signal characteristic of the respectively produced signal.

In this case, the endangering component can be moved from the state which endangers animals to a greater extent to the state which endangers animals to a lesser extent as soon as a predetermined number of animals, in particular one or more animals, enters a predetermined physical danger region within the monitored region. Defining a predetermined physical danger region within the monitored region is particularly expedient when the detection device, owing to its design, can monitor a region which is physically so large that detection would also take place of animals which are a great distance away from the endangering component. These animals which are at a considerable distance and are therefore possibly not (yet) endangered, would in this embodiment not initiate a state change of the component. Only when animals are detected within the defined danger region would the state change be initiated.

In one particular embodiment, it is possible, using the signal characteristic of the detected signal, to determine features relating to the animal, such as the distance between the animal and the component and/or the type and/or size of the animal, in which case the endangering component of the installation is moved from the state which endangers animals to a greater extent to the state which endangers animals to a lesser extent depending on at least one of these features.

In one particular embodiment, the state which endangers animals to a greater extent may be a movement of a component, such as the rotation of the rotor blades of a wind energy installation. Once one or more animals have been detected, the movement of the component can then be at least substantially suppressed in order to reach a state which endangers the animals to a lesser extent. In a similar manner, for example, a current flow through a stationary, current-carrying component can be at least substantially suppressed, or the voltage in a component subjected to electrical voltage can be reduced. Overall, the endangering state of the component should be reduced to a degree which endangers animals to a lesser extent.

As regards the detection of the animals, the physical environment should be monitored by means of at least two, preferably more than two, detectors which are physically separated from one another. As a result, precise spatial resolution of the animals to be detected is possible if they enter the detection region. In this case, the physical environment is monitored by means of one or more thermal imaging cameras, by means of radar devices, by means of sonar devices, by means of cameras, by means of sonar devices or by means of laser devices. All detector devices are possible and conceivable which make it possible to detect one or more types of animals in the monitored area. The detector device is preferably designed such that ultrasound signals from bats which enter the monitored region of the physical environment around the installation can be detected.

According to the invention, the endangering component is moved back to the state which endangers animals to a greater extent if no animals of the specific type, which were triggers for the component being moved to the state which endangers animals to a lesser extent, are detected in the monitored region during a predetermined period of time, in particular at least 3 minutes.

The monitoring region can be a preferably spherical or ellipsoidal region which extends in all directions around the installation, preferably around the component or around the obstacle. Numerous variants are possible here.

The object of the invention is also achieved by a preferred development which represents an independent aspect of the invention.

Accordingly, a method is specified for keeping and/or driving in particular flying animals away from obstacles of any type, such as buildings, components, installations, fences or the like, which endanger these animals, the physical environment around the obstacle being monitored at least in regions by means of a suitable detection device, in which case the detection device produces a signal when an animal of a specific type, in particular a bat, a bird or the like, enters the monitored region, said signal being suitable for drawing the animal's attention to the obstacle, in particular for keeping or driving it away from the obstacle. In this case, the animals can be kept away from the obstacle, for example, by means of sound, ultrasound or light signals originating from a signal source.

This method can be used to protect animals not only from installations which can assume states which endanger them to a greater or lesser extent. Rather, it is also possible to prevent in particular flying animals, such as birds, from colliding with buildings, installations, fences or the like, such as bridges or erected masts, whose components do not have any states which can be controlled and altered externally. A corresponding system according to the invention in this case has a detection device which can detect the animals and a signal source for driving the animals away. The system can be arranged directly on the buildings or suitably close to the buildings at suitable locations.

As is known to those skilled in the art, the above method and the system for keeping/driving the animals away can be combined with the above described method for operating installations having components which endanger animals and can assume different endangering states.

The above mentioned method for keeping/driving animals away from buildings and for operating installations having components which endanger animals are preferably used in the case of flying animals, such as birds, bats or the like, but are not restricted to these.

The object of the invention is also achieved by a preferred development as follows, which represents an independent aspect of the invention. A method for operating a wind energy installation, the wind energy installation having a rotor, which can be driven by wind and has at least one rotor blade, and a generator for the purpose of converting the mechanical energy of the rotor to electrical energy, the physical environment around the wind energy installation being monitored at least in regions by means of a suitable detection device, in which case the detection device produces a signal when an animal of a specific type, in particular a bat, enters the monitored region, in which case, depending on the number of animals detected, in particular per unit time, and/or depending on the signal characteristic of the respectively produced signal, the rotation of the rotor blade of the wind energy installation is at least substantially suppressed at least for a specific period of time or at least the rotational frequency of the rotor blade is reduced, and in which case the at least substantial suppression of the rotation of the rotor blade or the reduction in the rotational frequency is dispensed with or canceled a) depending on the number of animals detected, in particular per unit time, and/or b) depending on the signal characteristic of the respectively produced signal, and/or c) if, during a predetermined period of time, no animals of a specific type, which could be triggers for suppression of the rotation or for a reduction in the frequency of rotation, are detected in the monitored region.

The development relates to wind energy installations. In this case, the physical environment around the wind energy installation is monitored at least in regions by means of a suitable detection device, in which case the detection device produces a signal when a flying object of a specific type, in particular flying animals such as a bat, enters the monitored region, and in which case at least one operational parameter of the wind energy installation, such as the angle of incidence of the wind on the rotor blade, is adjusted depending on the signal. Accordingly, as soon as a flying object enters the monitored region, this flying object is recognized by the detection device. The signal from the detection device is the basis for the further running of the operation or the regulation of the wind energy installation.

In the context of this application, all conceivable parameters which can be adjusted in the case of a wind energy installation, such as the respective angle of incidence of the wind on the rotor blades, the parameters of braking powers or braking processes, the power output of the wind energy installation, specific operating states such as connection and disconnection states or the like and adjustable parameters of devices directly or indirectly associated with the wind energy installation, such as signal sources for the purpose of keeping animals or the like away, are understood to be adjustable operational parameters of the wind energy installation.

Depending on the number of flying objects detected, in particular per unit time, and/or depending on the signal characteristic of the respectively produced signal, the movement, in particular the rotation of the rotor blade of the wind energy installation, is at least substantially, preferably completely, suppressed at least for a predetermined period of time or at least the rotational frequency of the rotor blade is reduced. This takes place in particular by the angle of incidence of the wind on the rotor blade being correspondingly adjusted and/or by the rotation of the rotor or the rotor blade being braked and/or blocked. A particular case of at least substantial suppression of the rotation is, of course, the so-called shutdown of the installation or the installation being brought to a standstill.

This development of the invention therefore makes it possible to take measures to suppress any danger in response to flying objects, such as bats, which are actually present in the region of the wind energy installation and which may be endangered. As mentioned above, one of these measures may include shutting down the wind energy installation or suppressing or limiting the movement of the rotor blades such that any danger is ruled out. Another measure may be to transmit signals which drive the flying objects away, such as ultrasound signals in the case of bats. Various possibilities are conceivable here. In contrast to this, the wind energy installation needs to be shut down in the prior art at predetermined times, to be precise irrespective of whether flying objects are actually present in the region of the wind energy installation at these times.

In one further development of the invention, the number of flying objects detected per unit time is registered and a change to an operational parameter of the wind energy installation, such as changes to the respective angle of incidence of the wind on one or more rotor blades is carried out in order to at least substantially suppress or limit the movement of said rotor blades only when, for example, a predetermined threshold value is exceeded. Various information on the flying object can preferably be derived from the signal characteristic of the respectively produced signal, i.e. specific features relating to the flying object. For example, the distance between the flying object and the wind energy installation, in particular the rotor-blade plane, the speed of the flying object and/or the type and/or size of the flying object can preferably be derived from the signal.

In a further preferred embodiment, suppression of the rotation of the rotor blade or a reduction in the rotational frequency can be canceled again depending on the number of flying objects detected, in particular per unit time, and/or depending on the signal characteristic of the respectively produced signal. If, for example, the abovementioned threshold value, which was the trigger for the suppression, is undershot again, the suppression can be canceled. The same applies for the case in which at least substantial suppression or a reduction in the rotational frequency is brought about depending on the signal characteristic of the respectively produced signals. In one further embodiment, the suppression of the rotation of the rotor blade or the reduction in the rotational frequency can be canceled if, over a predetermined period of time, in particular at least three minutes, no flying objects of a specific type, which could be triggers for suppression of the rotation or for a frequency reduction, are detected in the monitored region. As an alternative, it is also possible for one simple embodiment to provide for the suppression of the rotation of the rotor blade or the reduction in the rotational frequency to be canceled directly after a predetermined period of time has elapsed, preferably after a period of time which may be between three minutes and three hours.

Using the signal characteristic of the detected signal, as mentioned above, preferably various features relating to the flying object, such as the distance between the flying object and the wind energy installation, in particular the rotor-blade plane, and/or the type and/or size and/or speed and/or direction of flight of the flying object, are determined. It is conceivable, for example, for the detection device to detect a large variety of types of flying objects, in which case possibly only a few of these flying objects should be triggers for further measures, such as the suppression of the movement of the rotor blade. From a large number of flying objects which are possibly detected by means of the detection device it is possible to determine those, for example bats, whose occurrence would make it necessary to intervene in the operation of the wind energy installation.

In accordance with one further embodiment of the method according to the invention, an imaginary, physical danger region is fixed within the monitored area. In this case, further measures are taken, i.e. operational parameters of the installation adjusted, in particular the rotor blade movement suppressed or the rotational frequency reduced, only as soon as a predetermined number of flying objects, in the simplest case one flying object, enters the danger region. Such a danger region can extend in the vertical direction at least from the point closest to the ground to the point furthest away from the ground of the area delineated by the rotor blade during a complete revolution. A spherical region around the wind energy installation is preferably also formed such that it extends in the vertical direction between these points. It is thus ensured that, if flying objects fly at the height of the rotating rotor blades, the wind energy installation is correspondingly adjusted in response to this. In this embodiment, it is therefore not absolutely necessary for flying objects which are registered, for example, only in the vicinity of the ground, i.e. at a considerable distance from the rotor-blade plane, to be triggers for intervention in the operation of the wind energy installation.

The monitoring region in the environment around the wind energy installation is preferably a region which extends in all directions around said wind energy installation, in particular a spherical or ellipsoidal region. Flying objects are thus detected which, coming from various directions, are potentially endangered by the rotor blades. In one particularly preferred embodiment of the method according to the invention, ultrasound signals from bats which enter the monitored region of the physical environment around the wind energy installation are detected by means of the detection device. In a known manner, bats emit ultrasound signals which can be detected in a corresponding manner. It is possible for the type of bat, the distance between the bat and the wind energy installation, its direction of flight or speed and other features to be determined from the ultrasound signals. The wind energy installation can be controlled on the basis of these features.

The object of the invention is also achieved by a preferred development which represents an independent aspect of the invention.

Accordingly, a method is specified for keeping and/or driving animals away from a wind energy installation, the wind energy installation having a rotor, which can be driven by wind and has at least one rotor blade, and a generator for the purpose of converting the mechanical energy of the rotor to electrical energy, and signals being transmitted into the environment around the wind energy installation, preferably ultrasound signals which are suitable for driving in particular flying animals, preferably bats, away. In this case, the signals can be transmitted in particular permanently or at specific times of the day or night, at which the animals to be driven away are particularly active. Alternatively, this method can be combined with the above described detection method. In this case, signals could be transmitted once it has been detected that flying objects have entered the monitored region and/or the danger region.

In accordance with a further independent aspect, the present invention relates to a wind energy installation for carrying out the abovementioned methods, namely, a wind energy installation having a rotor, which can be driven by wind and has at least one rotor blade, having a generator for the purpose of converting the mechanical energy of the rotor to electrical energy, having a detection device for the purpose of monitoring the physical environment around the wind energy installation at least in regions, in which case a signal can be produced by the detection device when a flying object of a specific type, in particular a bat, enters the monitored region, and having a control/regulating device which is designed in such a way that, depending on the number of animals detected, in particular per unit time, and/or depending on the signal characteristic of the respectively produced signal, the rotation of the rotor blade of the wind energy installation can be at least substantially suppressed at least for a specific period of time or at least the rotational frequency of the rotor blade can be reduced, and in which case, later, the at least substantial suppression of the rotation of the rotor blade or the reduction in the rotational frequency is dispensed with or can be canceled
a) depending on the number of animals detected, in particular per unit time, and/or
b) depending on the signal characteristic of the respectively produced signal, and/or
c) if, during a predetermined period of time, in particular at least 3 minutes, no animals of a specific type, which could be triggers for suppression of the rotation or for a reduction in the frequency of rotation, are detected in the monitored region.

BRIEF DESCRIPTION OF THE DRAWING FIGURES

Further features of the present invention are described in the attached dependent claims and the description below relating to a specific exemplary embodiment of the invention with reference to the operation of a wind energy installation and from the attached drawing, in which:

FIG. 1 shows a side view of a wind energy installation which is operated in accordance with the method according to the invention.

DETAILED DESCRIPTION OF PREFERRED EMBODIMENTS

FIG. 1 illustrates a wind energy installation 10 which has, at the end of a vertical tower 14 arranged on a horizontal base 12, a pod 16 which is arranged on the upper side of the tower. A rotor 18 which has a hub 20 is arranged at one end, which faces the wind, of the pod 16. Three rotor blades 22 are connected to the hub 20, the rotor-blade roots of the rotor blades 22 being inserted into corresponding openings in the hub 20 and being connected to said hub in a known manner.

The rotor 18 rotates about an axis which is slightly upwardly inclined with respect to the horizontal. As soon as wind impinges on the rotor blades 22, the rotor 18, with the rotor blades 22, is set in rotation about the rotor axis. The rotor blades 22 in the process cover a circular area. The rotor blades 22 can be altered individually in terms of their position with respect to the wind, i.e. the angle of incidence of the wind on the rotor blades 22 can be adjusted, by means of an adjusting device (not illustrated) which is known to those skilled in the prior art.

The basic design of the wind energy installation 10 having an at least approximately horizontal rotor axis is known in the prior art, with the result that a detailed description is not given.

The wind energy installation 10 has a detection device (not illustrated), by means of which ultrasound signals from bats can be received. For this purpose, various ultrasound receivers are arranged in the region of the pod 16 and the rotor 18 of the wind energy installation 10. The detection device of the wind energy installation can alternatively also be arranged such that it is physically separate from the actual construction of the wind energy installation 10, for example near to the ground in the indirect environment around the installation. A plurality of detectors which are physically separated from one another are preferably used in order to make it possible to spatially organize the bats. Depending on the type of detection device, numerous possibilities are conceivable here. Various other devices can be provided for detecting flying objects, for example radar systems or the like, in place of an ultrasound detection device.

Signals from bats which enter a spherical, imaginary danger region 24, whose center is formed by the pod 16 of the wind energy installation 10, can be received by means of the ultrasound detection device. The danger region 24 is a sub region of the area monitored by the detection device. The size of the monitored area depends essentially on the sensitivity and the physical arrangement of the ultrasound receivers.

The wind energy installation 10 has a control/regulating device which are supplied with signals from the detection device as soon as the latter detects flying objects. The control/regulating device regulates the wind energy installation as a function of the received signals in the following manner:

As soon as a bat enters the danger region 24 and transmits ultrasound signals there, these signals are received by the ultrasound receivers of the detection device. In the further course of the flight of the bat, this bat transmits further ultrasound signals continuously or at intervals. Conclusions can be drawn on the specific type of bat and the distance between the bat and the ultrasound receivers on the basis of the temporal length of the signals, the signal intensity, the signal frequency and further characteristics. In the simplest case for regulating the wind energy installation 10, this wind energy installation 10 is immediately brought to a standstill if a bat is detected in the danger region 24. Accordingly, the rotor blades 22 are brought from a state which endangers the bats to a greater extent (namely the rotational movement) to a state of little danger, namely the state in which the rotor blades are at a standstill.

In this exemplary embodiment, this is achieved by the rotor blades 22 being changed in terms of the angle of incidence of the wind on them, i.e. are rotated out of the wind. At the same time, the rotor shaft of the rotor 18 is braked by means of mechanical brakes and brought to a standstill. The wind energy installation remains in the state in which the rotor blades are at a standstill as long as the detection device detects this bat or other bats in the danger region 24. It is possible to determine by means of analyzing the bat signal whether the bat is located in the danger region 24, since the distance between the bat and the ultrasound receiver can be determined.

Various possibilities are conceivable for the individual technical implementations of the methods described in this application, and these possibilities are known to those skilled in the art.

What is claimed is:

1. A method for operating installations (10) having at least one component (22) which endangers flying animals, comprising the steps of:
    the component assuming a first state which endangers animals to a greater extent and a second state which endangers animals to a lesser extent,
    monitoring the physical environment around the installation (10) and around the component (22) at least in regions by means of a suitable detection device, the detection device producing a signal when a flying animal enters the monitored region,
    moving the component of the installation from the state which endangers animals to a greater extent to the state which endangers animals to a lesser extent depending on the signal and, later, moving the installation back to the state which endangers animals to a greater extent, depending on:
        a) the number of animals of a specific type detected per unit time, and/or
        b) the signal characteristic of the respectively produced signal, and/or
        c) if none of the animals of the specific type, which were triggers for the component being moved to the less dangerous state, are detected in the monitored region during a predetermined period of time.

2. The method as claimed in claim 1, wherein a movement of the component, a flow of current through the component or an electrical voltage state of the component is reduced to a degree which endangers the animals to a lesser extent.

3. The method as claimed in claim 1, wherein, using the signal characteristic of the detected signal to determine features relating to the animal, the component (22) of the installation (10) is moved from the state which endangers animals to a greater extent to the state which endangers animals to a lesser extent depending on at least one of these features.

4. The method as claimed in claim 3, wherein the signal characteristic of the detected signal to determine features relating to the animal is selected from the group consisting of the distance between the animal and the component (22), the type of the animal, and the size of the animal, and combinations thereof.

5. The method as claimed in claim 1, wherein the physical environment is monitored by means of at least two detectors which are physically separated from one another.

6. The method as claimed in claim 1, wherein the physical environment is monitored by means of at least one device selected from the group consisting of thermal imaging cameras, radar devices, sonar devices, cameras, sodar devices, and laser devices.

7. The method as claimed in claim 1, wherein the component (22) is moved from the state which endangers animals to a greater extent to the state which endangers animals to a lesser extent as soon as a predetermined number of animals enters a fixed, physical danger region within the monitored region.

8. The method as claimed in claim 1, wherein the monitoring region is a spherical or ellipsoidal region which extends in all directions around the installation (10) or around the component (22).

9. The method as claimed in claim 1, wherein ultrasound signals from the animals which enter the monitored region of the physical environment around the installation (10) are detected by means of the detection device.

10. The method as claimed in claim 1, wherein the animals are kept away from the installation (10) by means of sound, ultrasound or light signals.

11. A method for operating a wind energy installation, the wind energy installation (10) having a rotor (18), which can be driven by wind and has at least one rotor blade (22), and a generator for the purpose of converting the mechanical energy of the rotor (18) to electrical energy, comprising the steps of:
    monitoring the physical environment around the wind energy installation (10) at least in regions by means of a suitable detection device, the detection device producing a signal when a bat enters the monitored region, and
    depending on the number of the bats detected per unit time, and/or depending on the signal characteristic of the respectively produced signal, at least substantially suppressing the rotation of the rotor blade (22) of the wind energy installation (10) at least for a specific period of time or at least reducing the rotational frequency of the rotor blade (22),
    wherein the at least substantial suppression of the rotation of the rotor blade (22) or the reduction in the rotational frequency is dispensed with or canceled depending on:
        a) the number of the bats detected per unit time, and/or
        b) the signal characteristic of the respectively produced signal, and/or
        c) if, during a predetermined period of time, none of the bats, which could be triggers for suppression of the rotation or for a reduction in the frequency of rotation, are detected in the monitored region.

12. The method as claimed in claim 11, wherein, using the signal characteristic of the detected signal to determine features relating to the bat, the angle of incidence of the wind on the rotor blade (22) is adjusted depending on at least one of these features.

13. The method as claimed in claim 12, wherein the signal characteristic of the detected signal to determine features relating to the bat is selected from the group consisting of the distance between the bat and the wind energy installation (10), the distance between the bat and the rotor-blade plane, the type of the bat, and the size of the bat, and combinations thereof.

14. The method as claimed in claim 11, wherein the rotation of the rotor blade is at least substantially suppressed or the rotational frequency is reduced as soon as a predetermined number of the bats enters a fixed, physical danger region (24) within the monitored region.

15. The method as claimed in claim 14, wherein the danger region (24) extends in the vertical direction at least from the point closest to the ground to the point furthest away from the ground of the area delineated by the rotor blade (22) during a complete revolution.

16. The method as claimed in claim 11, wherein the monitoring region is a region which extends in all directions around the wind energy installation (10) in a spherical or ellipsoidal region.

17. The method as claimed in claim 11, wherein ultrasound signals from the bats which enter the monitored region of the physical environment around the wind energy installation (10) can be detected by means of the detection device.

18. The method as claimed in claim 11, wherein ultrasound signals are transmitted into the physical environment around the wind energy installation (10), the ultrasound signals being suitable for driving or keeping the bats away from the wind energy installation (10).

19. A wind energy installation (10) comprising:
 a rotor (18), which can be driven by wind and has at least one rotor blade (22),
 a generator for the purpose of converting the mechanical energy of the rotor (18) to electrical energy,
 a detection device for the purpose of monitoring the physical environment around the wind energy installation (10) at least in regions, the detection device producing a signal when a flying object of a specific type enters the monitored region, and
 a control/regulating device which is designed in such a way that, depending on the number of animals detected per unit time, and/or depending on the signal characteristic of the respectively produced signal, the rotation of the rotor blade (22) of the wind energy installation (10) is at least substantially suppressed at least for a specific period of time or at least the rotational frequency of the rotor blade (22) is reduced, and in which case, later, the at least substantial suppression of the rotation of the rotor blade (22) or the reduction in the rotational frequency is dispensed with or can be canceled depending on:
 a) the number of animals detected per unit time, and/or
 b) the signal characteristic of the respectively produced signal, and/or
 c) if, during a predetermined period of time, none of the animals of a specific type, which could be triggers for suppression of the rotation or for a reduction in the frequency of rotation, are detected in the monitored region.

20. The wind energy installation as claimed in claim 19, wherein the detection device is arranged on a tower (14) and/or on a pod (16) and/or on the rotor (18) of the wind energy installation (10).

21. The wind energy installation as claimed in claim 19, further comprising a signal source for the purpose of emitting signals into the physical environment around the wind energy installation (10) which are suitable for driving or keeping flying animals away from the wind energy installation (10).

22. The wind energy installation (10) as claimed in claim 21, wherein the signal source is arranged on a tower (14) and/or on a pod (16) and/or on the rotor (18) of the wind energy installation (10).

* * * * *